(12) United States Patent
Zheng

(10) Patent No.: US 11,596,161 B2
(45) Date of Patent: Mar. 7, 2023

(54) HIGHLAND BARLEY TEA AND PREPARATION METHOD THEREOF, AND RELATED PRODUCT

(71) Applicant: Yujiao Zheng, Shandong (CN)

(72) Inventor: Yujiao Zheng, Shandong (CN)

(*) Notice: Subject to any disclaimer, the term of this patent is extended or adjusted under 35 U.S.C. 154(b) by 104 days.

(21) Appl. No.: 17/059,277

(22) PCT Filed: Aug. 15, 2018

(86) PCT No.: PCT/CN2018/100657
§ 371 (c)(1),
(2) Date: Nov. 27, 2020

(87) PCT Pub. No.: WO2019/227685
PCT Pub. Date: Dec. 5, 2019

(65) Prior Publication Data
US 2021/0227847 A1  Jul. 29, 2021

(30) Foreign Application Priority Data
May 29, 2018 (CN) .......................... 201810571748.5

(51) Int. Cl.
*A23F 3/14* (2006.01)
*A23F 3/18* (2006.01)
*A23F 3/30* (2006.01)

(52) U.S. Cl.
CPC ................. *A23F 3/14* (2013.01); *A23F 3/18* (2013.01); *A23F 3/30* (2013.01)

(58) Field of Classification Search
CPC ................. A23F 3/14; A23F 3/18; A23F 3/30
See application file for complete search history.

(56) References Cited

FOREIGN PATENT DOCUMENTS

| CN | 1788627 A | | 6/2006 |
|----|-----------|---|--------|
| CN | 102524466 A | | 7/2012 |
| CN | 102524469 | * | 7/2012 |
| CN | 103109943 A | | 5/2013 |
| CN | 104431093 A | | 3/2015 |
| CN | 105941746 | * | 9/2016 |
| CN | 106261734 | * | 1/2017 |
| CN | 106720714 | * | 5/2017 |
| CN | 108378176 A | | 8/2018 |

OTHER PUBLICATIONS

English Translation for CN 102524466 published Jul. 2012.*
English Translation for CN 102524469 published Jul. 2012.*
English Translation for CN 106720714 published May 2017.*
English Translation for CN 104431093 published Mar. 2015.*
English Translation for CN 105941746 published Sep. 2016.*
English Translation for CN 106261734 published Jan. 2017.*
International Search Report, Application No. PCT/CN2018/100657, dated Feb. 20, 2019 4 pages, English Translation 2 pages.
The State Intellectual Property Office of People's Republic of China, First Office Action, Application No. 201810571748.5, dated Jan. 29, 2021, 15 pages. English Translation Attached, 7 pages.
The State Intellectual Property Office of People's Republic of China, Search Report, Application No. 2018105717485, dated Jan. 29, 2021, 1 page.
The State Intellectual Property Office of People's Republic of China, The Second Office Action, Application No. 201810571748.5, dated Jul. 27, 2021, 14 pages. English Translation, 9 pages.

* cited by examiner

*Primary Examiner* — Anthony J Weier
(74) *Attorney, Agent, or Firm* — Ziegler IP Law Group, LLC

(57) ABSTRACT

A preparation method of a highland barley tea includes stir-frying highland barley; after immersing the same in water, performing extraction at a temperature of 95±1° C., and filtering the extracted product to obtain a highland barley tea.

17 Claims, No Drawings

HIGHLAND BARLEY TEA AND PREPARATION METHOD THEREOF, AND RELATED PRODUCT

CROSS-REFERENCE TO RELATED APPLICATION

The present disclosure claims the priority to the Chinese patent application with the filing number 201810571748.5 entitled "Highland Barley Tea and Preparation Method and Product thereof" filed on May 29, 2018 with the Chinese Patent Office, the contents of which are incorporated herein by reference in entirety.

TECHNICAL FIELD

The present disclosure relates to the field of highland barley processing, in particular, to highland barley tea and a preparation method and a product thereof.

BACKGROUND ART

Highland barley is a cereal crop of hordeum of gramineae, and as the internal and external glumes thereof are separated, and the kernel is naked, it is also called as hulless barley, mainly produced in Tibet, Qinghai, Sichuan, Yunnan and other places in China, and it is main food of Tibetan people. The highland barley is rich in nutrition and has an outstanding medical health-care function, and related products thereof are gradually developed.

However, the existing processing method for highland barley products is simple, and the mouthfeel and the nutritional value of the products need to be improved.

SUMMARY

Objects of the present disclosure include providing a preparation method for highland barley tea, which method has high extraction efficiency and performs the extraction thoroughly.

Objects of the present disclosure further include providing highland barley tea prepared by the above preparation method, which highland barley tea effectively retains the nutritional ingredients in the highland barley, and has the natural flavor of highland barley, and smooth and refreshing mouthfeel.

Objects of the present disclosure further include providing a product containing the above highland barley tea, which is advantageous for expanding the application range of the highland barley, and broadening the application market of the highland barley tea product.

In order to realize at least one of the above objects of the present disclosure, the following technical solution may be adopted.

The first aspect of the present disclosure includes providing a preparation method for highland barley tea, for example, the preparation method may include the following steps:
stir-frying highland barley;
soaking the fried highland barley in water and then extracting the same, wherein the extraction temperature may be 95±1° C.; and
filtering a product obtained from the extraction to obtain the highland barley tea.

In the preparation method for highland barley tea provided in the present disclosure, after being fried, the highland barley is extracted by means of extraction at a relatively high temperature, which is simpler and more efficient than the prior mode in which the highland barley is pulverized and then extracted with water and then extracted at normal temperature. Furthermore, the mouthfeel and taste of the highland barley tea obtained in the present disclosure are obviously superior to those of the existing highland barley tea.

In some preferred embodiments of the present disclosure, the soaking temperature may be 85-90° C., and the soaking time may be 40-50 min.

For example, in different examples, the soaking temperature may be 85° C., 86° C., 87° C., 88° C., 89° C. or 90° C.; and the soaking time may be 40 min, 41 min, 42 min, 45 min, 46 min, 47 min, 48 min, 49 min or 50 min.

Using the above soaking temperature and soaking time facilitates subsequent extraction of the highland barley grains.

In some preferred embodiments of the present disclosure, the electrical conductivity of the water may be controlled, for example, in a range not greater than 10 µs/cm. Water having the electrical conductivity in the above range facilitates sufficient dissolution of the effective nutritional ingredients in the highland barley.

In some embodiments of the present disclosure, drinking pure water may be directly adopted as the water used for soaking.

In some preferred embodiments of the present disclosure, the ratio of weight of water used for soaking to weight of the highland barley to be soaked may be 15-18:1.

For example, in different examples, the ratio of the weight of water used for soaking to the weight of the highland barley to be soaked may be 15:1, 16:1, 17:1 or 18:1.

In some preferred embodiments of the present disclosure, the number of times of extraction may be no greater than 15 times, preferably 14-15 times, and the extraction may last for 55-60 s each time.

For example, in different examples, the time of extraction may be 55 s, 56 s, 57 s, 58 s, 59 s or 60 s.

It was found through tests that the ingredients in the highland barley may be completely extracted through 14-15 times of extraction under the condition that the extraction lasts for 55-60 s each time.

In some embodiments of the present disclosure, the extraction may be carried out in an extraction tank that may be directly commercially available.

In some embodiments of the present disclosure, a product obtained from extraction is filtered with a 100±10 mesh filter bag and/or a 15±5 µm filter bag, and then is cooled.

In some preferred embodiments of the present disclosure, the product obtained from extraction is filtered with a 100±10 mesh filter bag and a 15±5 µm filter bag in sequence, and then is cooled.

After extraction, the resultant extraction product passes through the filter bags of certain meshes stepwise, then big particle matters in the extraction product may be sufficiently removed. Moreover, the filter bags used for filtration have a low cost, and may be reused, which reduces the preparation cost.

In some preferred embodiments of the present disclosure, a cooling temperature after the filtration may be controlled in a range not greater than 30° C., and generally, the filtrate is just cooled to a room temperature (e.g., 10-30° C.).

In some preferred embodiments of the present disclosure, after cooling, a cooled solution may be further filtered with a 5±2 µm filter bag and a 1±0.5 µm filter cartridge in sequence, to obtain the highland barley tea.

After cooling, by means of further filtration, the transparency of the extract solution may be further improved.

Generally, the filter cartridge used in the present disclosure is preferably made of a stainless steel material, thus the loss of beneficial elements may be prevented while ensuring removal of impurities in the extract solution.

In some preferred embodiments of the present disclosure, steps of cleaning and drying further may be carried out before stir-frying the highland barley.

Generally, the drying may be baking the highland barley to a water content of 18 wt %-22 wt %.

In some preferred embodiments of the present disclosure, a sterilization operation is further included between the stir-frying and the soaking in water, and the sterilization preferably adopts microwave sterilization.

The microwave sterilization is simple and easy to operate, without affecting the taste of the highland barley.

In some embodiments of the present disclosure, the above microwave sterilization may be carried out under a condition at a microwave frequency of 1000 MHz-5000 MHz for 2-3 min.

In some preferred embodiments of the present disclosure, the above microwave sterilization may be carried out at a microwave frequency of 2000-4000 MHz for 2.5-3 min.

In some preferred embodiments of the present disclosure, the temperature of stir-frying may be 175-185° C., and the time of stir-frying may be no more than 1 min.

In some more preferred embodiments of the present disclosure, the time of stir-frying generally is 30 s-1 min, and the highland barley after being fried becomes popped.

A second aspect of the present disclosure includes providing highland barley tea prepared by the above preparation method.

The highland barley tea obtained effectively retains the nutritional ingredients in the highland barley, has the transparency no more than 0.05 according to $OD_{720}$ and a soluble solid content no less than 0.4, and has the natural flavor of the highland barley as well as smooth and refreshing mouthfeel.

A third aspect of the present disclosure includes providing a product containing the above highland barley tea.

For reference, the highland barley tea provided in the present disclosure is directly edible, and also may be adjusted into drinks with different tastes by adding other flavorings, or may be modulated and then used as a mother liquor to be mixed with other drinks, so as to prepare into drinks with different tastes; and a liquid substance containing the highland barley tea may also be processed into a variety of food.

For example, the above highland barley tea may be used as a blend liquid.

For example, vitamin C, D-Sodium isoascorbiate, sodium bicarbonate, potassium sorbate and perfumes may be added to the above highland barley tea and mixed to obtain a blend liquid with a corresponding taste.

For example, the perfume may be Givaudan barley tea perfume. Vitamin C and D-Sodium isoascorbiate may be dissolved in pure water below 40° C. Sodium bicarbonate and potassium sorbate may be dissolved in pure water above 60° C. Then, respective components are just placed in a blending tank and mixed.

The resulted blend liquid is directly edible, and may also be used as a blend liquid for other drinks.

Compared with the prior art, the beneficial effects of the present disclosure include:

(1) in the preparation method for highland barley tea provided in the present disclosure, the highland barley is first fried, and then soaked in water, and then extracted, so that the highland barley tea obtained from the extraction has the natural flavor of highland barley, smooth and refreshing taste, and outstanding advantage in taste and mouthfeel.

(2) The preparation method for highland barley tea provided in the present disclosure is efficient in extraction, with physical extraction in the whole process, thus the natural nutritional ingredients of the highland barley are retained.

(3) The highland barley tea provided in the present disclosure may be processed into a variety of products, for example, various food including drinks, thus expanding the application range of the highland barley.

DETAILED DESCRIPTION OF EMBODIMENTS

Embodiments of the present disclosure will be described in detail below in combination with examples, while a person skilled in the art would understand that the following examples are merely used for illustrating the present disclosure, but should not be considered as limitation to the scope of the present disclosure. If no specific conditions are specified in the examples, they are carried out under normal conditions or conditions recommended by manufacturers. If manufacturers of reagents or apparatuses used are not specified, they are conventional products commercially available.

The highland barley tea provided in the present disclosure takes highland barley as a main raw material. Hulless barley, neutral in nature and salty in taste, enters spleen, stomach and large intestine meridians, contains β-glucan, dietary fibers, proteins, fats, starches, vitamins B and rare nutritional ingredients (such as thiamine, riboflavin and nicotinic acid), etc., has effects of invigorating spleen and stomach, invigorating qi and relieving diarrhea, strengthening tendons and benefiting strength, eliminating dampness and inducing perspiration, and also may be eaten by people with spleen and stomach deficiency, listlessness, and diarrhea and loose stool.

The preparation method for highland barley tea provided in the present disclosure may include, for example, the following steps: stir-frying highland barley; soaking the fried highland barley in water and then extracting the same, wherein the extraction temperature may be 95±1° C.; and filtering a product obtained from the extraction to obtain the highland barley tea.

In the above preparation method, the highland barley is first fried, and then extracted by means of extraction at a relatively high temperature (94-96° C.), which is simpler and more efficient than the prior mode in which the highland barley is pulverized and then directly extracted with water or is pulverized, then extracted with water and then extracted at normal temperature (15-30° C.). Furthermore, the mouthfeel and taste of the highland barley tea prepared in the present disclosure are obviously superior to those of the highland barley tea prepared using the prior art.

The fried highland barley becomes popped, so that the integrity of the highland barley structure is damaged to a certain extent, but just as the integrity is damaged, on one hand, the unique flavor of the highland barley after being fried is advantageously emitted, and on the other hand, the dissolution rate and the extraction rate of active substances and nutritional ingredients in the highland barley are advantageously improved.

In some preferred embodiments of the present disclosure, the temperature of the above stir-frying may be 175-185° C., for example, 175° C., 176° C., 177° C., 178° C., 179° C., 180° C., 181° C., 182° C., 183° C., 184° C. or 185° C.; besides, the temperature also may be any specific temperature between any two temperature values above, such as 175.5° C., 176.5° C., 177.5° C., 178.5° C., 179.5° C., 180.5° C., 181.5° C., 182.5° C., 183.5° C. or 184.5° C.

In some preferred embodiments of the present disclosure, the time of the above stir-frying may be no more than 1 min, such as 10 s, 20 s, 30 s, 40 s, 50 s or 60 s, and also may be any specific time between any two time values above, such as 15 s, 25 s, 35 s, 45 s or 55 s.

In some more preferred embodiments of the present disclosure, the time of stir-frying may be 30 s-1 min, such as 30 s, 35 s, 40 s, 45 s, 50 s, 55 s or 60 s. This stir-frying time range in combination with the above stir-frying temperature can enable the highland barley to sufficiently emit the special flavor, and meanwhile, can avoid inactivation of part of the active substances under the high temperature condition after a too long time of stir-frying, which influences the mouthfeel and nutrition of the highland barley tea.

In some preferred embodiments of the present disclosure, raw material of the highland barley further may be cleaned and dried before stir-frying the highland barley. For reference, the drying may be baking the raw material of highland barley to a water content of 18 wt %-22 wt %, for example, 18 wt %, 19 wt %, 20 wt %, 21 wt % or 22 wt %, or may be any specific water content between any two water content values above, for example, 18.5 wt %, 19.5 wt %, 20.5 wt % or 21.5 wt %.

The above drying step is advantageous for removing most of the moisture contained in the highland barley, so that the highland barley is effectively fried into popped highland barley under the conditions of the stir-frying temperature and the stir-frying time provided in the present disclosure, thereby avoiding the phenomenon that the surface of the highland barley is wrinkled or scorched while the moisture inside the highland barley is not sufficiently removed in the stir-frying process.

In some preferred embodiments of the present disclosure, a sterilization operation is further included between the stir-frying and the soaking in water, and the sterilization preferably adopts microwave sterilization. The microwave sterilization is efficient and quick, and simple and easy to operate, without affecting the taste of the highland barley.

For reference, the above microwave sterilization may be carried out under a condition at a microwave frequency of 1000 MHz-5000 MHz for 2-3 min, preferably at a microwave frequency of 2000-4000 MHz for 2.5-3 min. In this sterilization process, microwaves can penetrate from the surface of the highland barley to the inner structure of the highland barley, and can keep consistent heating for the exterior and interior of the highland barley.

In some preferred embodiments of the present disclosure, the soaking temperature may be 85-90° C., and the soaking time may be 40-50 min.

For example, in different examples, the soaking temperature may be 85° C., 86° C., 87° C., 88° C., 89° C. or 90° C., and also may be any specific temperature between any two temperature values above, such as 85.5° C., 86.5° C., 87.5° C., 88.5° C. or 89.5° C.

For example, in different examples, the soaking time may be 40 min, 41 min, 42 min, 45 min, 46 min, 47 min, 48 min, 49 min or 50 min, and also may be any specific time between any two time values above, such as 40.5 min, 41.5 min, 42.5 min, 43.5 min, 44.5 min, 45.5 min, 46.5 min, 47.5 min, 48.5 min or 49.5 min.

Using the above soaking temperature and soaking time is advantageous for swelling the popped highland barley, and facilitates subsequent extraction of the highland barley grains.

In some preferred embodiments of the present disclosure, the electrical conductivity of the water used for soaking may be controlled, for example, in a range not greater than 10 µs/cm, such as 10 µs/cm, 9 µs/cm, 8 µs/cm, 7 µs/cm, 6 µs/cm, 5 µs/cm, 4 µs/cm, 3 µs/cm, 2 µs/cm or 1 µs/cm. Water having the electrical conductivity in the above range facilitates sufficient dissolution of the effective nutritional ingredients in the highland barley.

In some embodiments of the present disclosure, drinking pure water may be directly adopted as the water used for soaking, besides, pure water which has been further filtered or purified or the like may also be adopted.

In some preferred embodiments of the present disclosure, the ratio of weight of water used for soaking to weight of the highland barley to be soaked may be 15-18:1. For example, in different examples, the ratio of the weight of water used for soaking to the weight of the highland barley to be soaked may be 15:1, 15.5:1, 16:1, 16.5:1, 17:1, 17.5:1 or 18:1.

In some preferred embodiments of the present disclosure, the number of times of extraction may be no greater than 15 times, preferably 14-15 times, and the extraction may last for 55-60 s each time. For example, in different examples, the time of extraction may be 55 s, 56 s, 57 s, 58 s, 59 s or 60 s, and also may be any specific time between any two time values above, such as 55.5 s, 56.5 s, 57.5 s, 58.5 s or 59.5 s.

It was found through tests that the ingredients in the highland barley may be completely extracted through 14-15 times of extraction under the condition that the extraction lasts for 55-60 s each time.

In some embodiments of the present disclosure, the extraction may be carried out in an extraction tank that may be directly commercially available, besides, the extraction may also be carried out in an apparatus capable of realizing extraction, such as separating funnel.

In some embodiments of the present disclosure, a product obtained from extraction is subjected to one time of filtration, for example, the filtration may be carried out with a 100±10 mesh filter bag or a 15±5 µm filter bag.

In some preferred embodiments of the present disclosure, the product obtained from extraction is subjected to two times of filtration with a 100±10 mesh filter bag and a 15±5 µm filter bag in sequence, respectively.

By filtering the resultant extraction product stepwise with the filter bags of certain meshes, big particle matters in the extraction product beyond the range of particle size of filter devices may be sufficiently removed. Moreover, the filter bags used for filtration have a low cost, and may be reused, which reduces the preparation cost.

After the filtration, cooling a filtrate is further included. In some preferred embodiments of the present disclosure, a cooling temperature after the filtration may be controlled in a range not greater than 30° C., and generally, the filtrate is just cooled to a room temperature (e.g., 10-30° C.).

It is worth explained that in some more preferred embodiments of the present disclosure, after cooling, a cooled product may be further filtered with a 5±2 µm filter bag and a 1±0.5 µm filter cartridge in turn, so as to obtain an extract solution (i.e. highland barley tea). After cooling, by means of further filtration, the transparency of the extract solution may be further improved.

Preferably, the filter cartridge used in the present disclosure may be a filter cartridge made of a stainless steel material. Such filter cartridge can prevent loss of beneficial elements contained in the highland barley while being capable of ensuring removal of impurities in the extract solution.

A second aspect of the present disclosure includes providing highland barley tea prepared by the above preparation method. The highland barley tea obtained effectively retains the nutritional ingredients in the highland barley, has the transparency no more than 0.05 according to $OD_{720}$ and a soluble solid content no less than 0.4, and has the natural flavor of the highland barley as well as smooth and refreshing mouthfeel.

A third aspect of the present disclosure includes providing a product containing the above highland barley tea. For reference, the highland barley tea provided in the present disclosure is directly edible, and also may be adjusted into drinks with different tastes by adding other flavorings, or may be modulated and then used as a mother liquor to be mixed with other drinks, so as to prepare into drinks with different tastes. A liquid substance containing the highland barley tea may also be processed into a variety of food.

For example, the above highland barley tea may be used as a blend liquid for adjusting or improving the mouthfeel and nutritional composition of food.

For reference, vitamin C, D-Sodium isoascorbiate, sodium bicarbonate, potassium sorbate and perfumes may be added to the above highland barley tea and mixed to obtain a blend liquid with a corresponding taste.

In the above, the D-Sodium isoascorbiate, which is more stable than ascorbic acid in property, and weaker than Vitamin C in acidity, may be used for supplementing vitamin C content of the blend liquid through cooperation with vitamin C. Moreover, the D-Sodium isoascorbiate further can be used as food nutrition enhancer, color fixative and antioxidant.

Potassium sorbate can effectively inhibit the activity of mycete, yeast and aerobic bacteria, and also can prevent the growth and propagation of harmful microorganisms such as *Clostridium botulinum*, *Staphylococcus* and *Salmonella*, but is almost ineffective against beneficial microorganisms such as anaerobic spores and *Lactobacillus acidophilus*. Its effect of inhibiting development is stronger than the sterilization effect. When potassium sorbate is mixed with the highland barley tea, the shelf time of the food containing the highland barley tea can be effectively prolonged, and the original flavor of the original highland barley tea is maintained.

In some specific embodiments, the perfumes above may be Givaudan barley tea perfumes. Vitamin C and D-Sodium isoascorbiate may be dissolved in pure water below 40° C. Sodium bicarbonate and potassium sorbate may be dissolved in pure water above 60° C. Then, the above components are just mixed (the mixing may be carried out in a blending tank).

The resulted blend is directly edible, and may also be used as a blend for other drinks. In addition, it also may be used as one of raw materials for other food, such as pastries or dishes, so that it is advantageous for expanding the application range of the highland barley, and broadening the application market of the highland barley tea products.

The features and performances of the present disclosure are further described in detail below in combination with examples.

Example 1

A preparation method for highland barley tea, including following steps:
washing highland barley with water, and then drying the highland barley until a water content of the highland barley was 20 wt %;
stir-frying the dried highland barley at a stir-frying temperature of 175° C. for 50 s, to obtain popped highland barley;
making the popped highland barley undergo microwave sterilization, then placing the popped highland barley in an extraction tank, and adding drinking pure water, with a ratio of weight of the water to weight of the highland barley being 17:1, and electrical conductivity of the water being not greater than 10 μs/cm;
soaking the popped highland barley at a temperature of 90° C. for 45 min;
then extracting at a temperature of 95±1° C. for 15 times, 55 s for each time of extraction; and
adding a 100 mesh filter bag outside an extraction bucket of the extraction tank, enabling the extract solution to flow out through this filter bag, filtering the resultant with a 15 μm filter bag, then cooling the resultant with a cooler to be not greater than 30° C., making the resultant flow into a storage tank, followed by filtration with a 5 μm filter bag and 1 μm filter cartridge to obtain the highland barley tea.

Example 2

A preparation method for highland barley tea, including following steps:
washing highland barley with water, and then drying the highland barley until a water content of the highland barley was 20 wt %;
stir-frying the dried highland barley at a stir-frying temperature of 180° C. for 40 s, to obtain popped highland barley;
making the popped highland barley undergo microwave sterilization, then placing the popped highland barley in an extraction tank, and adding drinking pure water, with a ratio of weight of the water to weight of the highland barley being 15:1, and electrical conductivity of the water being not greater than 10 μs/cm;
soaking the popped highland barley at a temperature of 85° C. for 50 min;
then extracting at a temperature of 95±1° C. for 14 times, 60 s for each time of extraction; and
adding a 100 mesh filter bag outside an extraction bucket of the extraction tank, enabling the extract solution to flow out through this filter bag, filtering the resultant with a 15 μm filter bag, then cooling the resultant with a cooler to be not greater than 30° C., making the resultant flow into a storage tank, followed by filtration with a 5 μm filter bag and 1 μm filter cartridge to obtain the highland barley tea.

Example 3

A preparation method for highland barley tea, including following steps:
washing highland barley with water, and then drying the highland barley until a water content of the highland barley was 20 wt %;
stir-frying the dried highland barley at a stir-frying temperature of 185° C. for 30 s, to obtain popped highland barley;
making the popped highland barley undergo microwave sterilization, then placing the popped highland barley in an extraction tank, and adding drinking pure water, with a ratio of weight of the water to weight of the highland barley being 18:1, and electrical conductivity of the water being not greater than 10 μs/cm;
soaking the popped highland barley at a temperature of 90° C. for 40 min;
then extracting at a temperature of 95±1° C. for 15 times, 60 s for each time of extraction; and adding a 100 mesh filter bag outside an extraction bucket of the extraction tank, enabling the extract solution to flow out through this filter bag, filtering the resultant with a 15 μm filter bag, then cooling the resultant with a cooler to be not greater than 30° C., making the resultant flow into a storage tank, followed by filtration with a 5 μm filter bag and 1 μm filter cartridge to obtain the highland barley tea.

Example 4

A preparation method for highland barley tea, including following steps:
washing highland barley with water, and then drying the highland barley until a water content of the highland barley was 20 wt %;
stir-frying the dried highland barley at a stir-frying temperature of 180° C. for 40 s, to obtain popped highland barley;
making the popped highland barley undergo microwave sterilization, then placing the popped highland barley in an extraction tank, and adding drinking pure water, a ratio of weight of the water to weight of the highland barley being 16:1, and electrical conductivity of the water being not greater than 10 μs/cm;
soaking the popped highland barley at a temperature of 90° C. for 45 min;
then extracting at a temperature of 95±1° C. for 15 times, 55 s for each time of extraction; and
adding a 110 mesh filter bag outside an extraction bucket of the extraction tank, enabling the extract solution to flow out through this filter bag, filtering the resultant with a 20 μm filter bag, then cooling the resultant with a cooler to be not greater than 30° C., making the resultant flow into a storage tank, followed by filtration with a 7 μm filter bag and 1.5 μm filter cartridge to obtain the highland barley tea.

Example 5

A preparation method for highland barley tea, including following steps:
washing highland barley with water, and then drying the highland barley until a water content of the highland barley was 20 wt %;
stir-frying the dried highland barley at a stir-frying temperature of 180° C. for 50 s, to obtain popped highland barley;
making the popped highland barley undergo microwave sterilization, then placing the popped highland barley in an extraction tank, and adding drinking pure water, with a ratio of weight of the water to weight of the highland barley being 17:1, and electrical conductivity of the water being not greater than 10 μs/cm;
soaking the popped highland barley at a temperature of 87° C. for 40 min;
then extracting at a temperature of 95±1° C. for 15 times, 60 s for each time of extraction; and
adding a 90 mesh filter bag outside an extraction bucket of the extraction tank, enabling the extract solution to flow out through this filter bag, filtering the resultant with a 10 μm filter bag, then cooling the resultant with a cooler to be not greater than 30° C., making the resultant flow into a storage tank, followed by filtration with a 3 μm filter bag and 0.5 μm filter cartridge to obtain the highland barley tea.

Example 6

A preparation method for highland barley tea, including following steps:
washing highland barley with water, and then drying the highland barley until a water content of the highland barley was 20 wt %;
stir-frying the dried highland barley at a stir-frying temperature of 180° C. for 45 s, to obtain popped highland barley;
making the popped highland barley undergo microwave sterilization, then placing the popped highland barley in an extraction tank, and adding drinking pure water, with a ratio of weight of the water to weight of the highland barley being 16:1, and electrical conductivity of the water being not greater than 10 μs/cm;
soaking the popped highland barley at a temperature of 88° C. for 45 min;
then extracting at a temperature of 95±1° C. for 15 times, 60 s for each time of extraction; and
adding a 100 mesh filter bag outside an extraction bucket of the extraction tank, enabling the extract solution to flow out through this filter bag, filtering the resultant with a 15 μm filter bag, then cooling the resultant with a cooler to be not greater than 30° C., making the resultant flow into a storage tank, followed by filtration with a 5 μm filter bag and 1 μm filter cartridge to obtain the highland barley tea.

Example 7

A preparation method for highland barley tea, including following steps:
washing highland barley with water, and then drying the highland barley until a water content of the highland barley was 18 wt %;
stir-frying the dried highland barley at a stir-frying temperature of 178° C. for 60 s, to obtain popped highland barley;
making the popped highland barley undergo microwave sterilization (sterilization for 3 min at a microwave frequency of 1000 MHz), then placing the popped highland barley in an extraction tank, and adding pure water, with a ratio of weight of the water to weight of the highland barley being 15.5:1, and electrical conductivity of the water being 10 μs/cm;
soaking the popped highland barley at a temperature of 86.5° C. for 48.5 min;
then extracting at a temperature of 94° C. for 15 times, 58.5 s for each time of extraction; and
adding a 110 mesh filter bag outside an extraction bucket of the extraction tank, enabling the extract solution to flow out through this filter bag, then cooling the resultant with a cooler to 25° C., making the resultant flow into a storage tank, followed by filtration with a 5 μm filter bag and 1 μm filter cartridge to obtain the highland barley tea.

Example 8

A preparation method for highland barley tea, including following steps:
washing highland barley with water, and then drying the highland barley until a water content of the highland barley was 22 wt %;
stir-frying the dried highland barley at a stir-frying temperature of 182.5° C. for 20 s, to obtain popped highland barley;
making the popped highland barley undergo microwave sterilization (sterilization for 2 min at a microwave frequency of 5000 MHz), then placing the popped highland barley in an extraction tank, and adding pure water, with a ratio of weight of the water to weight of the highland barley being 17.5:1, and electrical conductivity of the water being 6 μs/cm;

soaking the popped highland barley at a temperature of 88.5° C. for 42.5 min;
then extracting at a temperature of 96° C. for 15 times, 56.5 s for each time of extraction; and
adding a 15 μs filter bag outside an extraction bucket of the extraction tank for filtration, enabling the extract solution to flow out through this filter bag, then cooling the resultant with a cooler to 20° C., making the resultant flow into a storage tank, followed by filtration with a 5 μm filter bag and 1 μm filter cartridge to obtain the highland barley tea.

Example 9

A preparation method for highland barley tea, including following steps:
washing highland barley with water, and then drying the highland barley until a water content of the highland barley was 20 wt %;
stir-frying the dried highland barley at a stir-frying temperature of 180.5° C. for 55 s, to obtain popped highland barley;
making the popped highland barley undergo microwave sterilization (sterilization for 3 min at a microwave frequency of 2000 MHz), then placing the popped highland barley in an extraction tank, and adding pure water, with a ratio of weight of the water to weight of the highland barley being 15.5:1, and electrical conductivity of the water being 8 μs/cm;
soaking the popped highland barley at a temperature of 86° C. for 48 min;
then extracting at a temperature of 96° C. for 15 times, 58 s for each time of extraction; and
adding a 15 μs filter bag outside an extraction bucket of the extraction tank for filtration, enabling the extract solution to flow out through this filter bag, then cooling the resultant with a cooler to 20° C., making the resultant flow into a storage tank, followed by filtration with a 5 μm filter bag and 1 μm filter cartridge to obtain the highland barley tea.

Example 10

A preparation method for highland barley tea, including following steps:
stir-frying the highland barley under a condition with a temperature of 182.5° C. for 20 s, to obtain popped highland barley;
adding pure water, with a ratio of weight of the water to weight of the highland barley being 17.5:1, and electrical conductivity of the water being 10 μs/cm;
soaking the popped highland barley under a condition of 88.5° C. for 42.5 min;
then extracting at a temperature of 96° C. for 15 times, 56.5 s for each time of extraction; and
adding a 100 mesh filter bag outside an extraction bucket of the extraction tank, enabling the extract solution to flow out through this filter bag, filtering the resultant with a 15 μm filter bag, then cooling the resultant with a cooler to be 15° C., making the resultant flow into a storage tank, followed by filtration with a 5 μm filter bag and 1 μm filter cartridge to obtain the highland barley tea.

Example 11

A preparation method for highland barley tea, including following steps:
washing the highland barley with water, and then drying the highland barley until a water content of the highland barley was 20 wt %;
stir-frying the dried highland barley at a stir-frying temperature of 180° C. for 45 s, to obtain popped highland barley;
making the popped highland barley undergo microwave sterilization (sterilization for 2.5 min at a microwave frequency of 3000 MHz), then placing the popped highland barley in an extraction tank, and adding pure water, with a ratio of weight of the water to weight of the highland barley being 16.5:1, and electrical conductivity of the water being 5 μs/cm;
soaking the popped highland barley at a temperature of 87.5° C. for 45 min;
then extracting at a temperature of 96° C. for 15 times, 58 s for each time of extraction; and
adding a 100 mesh filter bag outside an extraction bucket of the extraction tank, enabling the extract solution to flow out through this filter bag, filtering the resultant with a 15 μm filter bag, then cooling the resultant with a cooler to 10° C., making the resultant flow into a storage tank, followed by filtration with a 5 μm filter bag and 1 μm filter cartridge to obtain the highland barley tea.

Example 12

The present example provides a beverage containing highland barley tea. Specifically, the highland barley tea is mixed with vitamin C, D-Sodium isoascorbiate, sodium bicarbonate, potassium sorbate and perfumes to obtain a highland barley tea drink. In the above, the highland barley tea may be provided by any one of Examples 1-11.

Example 13

The present example provides a beverage containing highland barley tea. Specifically, the highland barley tea is mixed with vitamin C, D-Sodium isoascorbiate D-Sodium isoascorbiate, sodium bicarbonate, potassium sorbate and perfumes to obtain a highland barley tea blend. The highland barley tea blend liquid is mixed with other drinks to obtain a new beverage product. In the above, the highland barley tea may be provided by any one of Examples 1-11.

Example 14

The present example provides a pastry containing highland barley tea. Specifically, the highland barley tea, as one of raw materials for making pastry, is mixed with other raw materials of pastry to obtain the pastry containing the highland barley tea according to the conventional method for making pastries. In the above, the highland barley tea may be provided by any one of Examples 1-11.

Example 15

The present example provides a dish containing highland barley tea. Specifically, the highland barley tea, as one of raw materials for making dish, is mixed with other raw materials of dish to obtain the dish containing the highland barley tea according to the conventional method for making dishes. In the above, the highland barley tea may be provided by any one of Examples 1-11.

Comparative Example 1

Different from Example 1, the water adopted is tap water.

Comparative Example 2

A preparation method for highland barley tea, including following steps:

washing highland barley with water, and then drying the highland barley until a water content of the highland barley was about 12%;
baking the dried highland barley at 230° C. for 5 minutes until the surface of the highland barley turned brown; and pulverizing the baked highland barley to 30 meshes, soaking the pulverized highland barley in 70-80° C. water for 50 min, with a weight ratio of the water to the highland barley being 11:1, followed by centrifugal separation to obtain a supernatant, i.e. the highland barley tea.

Comparative Example 3

A preparation method for highland barley tea, including following steps:
washing highland barley with water, and then drying the highland barley until a water content of the highland barley was about 12%;
baking the dried highland barley at 230° C. for 5 minutes until the surface of the highland barley turned brown;
pulverizing the baked highland barley to 30 meshes, soaking the pulverized highland barley in 70-80° C. water for 50 min, with a weight ratio of the water to the highland barley being 11:1, to obtain a leach liquor; and
after rough filtration of the leach liquor, extracting the resultant three times, wherein a supernatant obtained through centrifugal separation was just the highland barley tea.

Comparative Example 4

A preparation method for highland barley tea, including following steps:
washing highland barley with water, and then drying the highland barley until a water content of the highland barley was about 12%;
baking the dried highland barley at 230° C. for 5 minutes until the surface of the highland barley turned brown;
pulverizing the baked highland barley to 30 meshes, soaking the pulverized highland barley in 70-80° C. water for 50 min, with a weight ratio of the water to the highland barley being 11:1, to obtain a leach liquor; and
after rough filtration of the leach liquor, extracting the resultant three times at room temperature, followed by filtration with a 15±5 μm filter bag, a 5±2 μm filter bag and 1±0.5 μm filter cartridge to obtain the highland barley tea.

Experimental Example 1

Taking Examples 1-6 as an example, the highland barley tea prepared in Examples 1-6 and Comparative Examples 1-4 was evaluated from transparency, mouthfeel and taste.
Transparency was obtained by measuring $OD_{720}$.
Mouthfeel and taste were evaluated by way of market research. The market research was conducted in six cities, Lhasa, Wuhan, Guangzhou, Zhengzhou, Jinan and Shenyang, respectively, involving 1000 people in total, aged 20-60, who had a great understanding of highland barley. After tasting, the mouthfeel, taste and preference were scored, 100 scores for each index. The mouthfeel is mainly directed to the refreshing and smooth degree of the highland barley tea, the taste is mainly directed to the natural flavor of the highland barley, and the preference is based on overall feel. Then, the data was statistically counted, and the average value was calculated, to obtain the final scores. Details are as shown in Table 1.

TABLE 1

Statistical Results

| Group | Transparency $OD_{720}$ | Score of Mouthfeel | Score of Taste | Preference |
|---|---|---|---|---|
| Example 1 | 0.03 | 95 | 94 | 96 |
| Example 2 | 0.04 | 93 | 95 | 95 |
| Example 3 | 0.03 | 94 | 94 | 95 |
| Example 4 | 0.05 | 92 | 93 | 94 |
| Example 5 | 0.03 | 95 | 92 | 94 |
| Example 6 | 0.03 | 94 | 94 | 95 |
| Comparative Example 1 | 0.04 | 83 | 85 | 83 |
| Comparative Example 2 | 0.27 | 63 | 62 | 64 |
| Comparative Example 3 | 0.15 | 70 | 73 | 72 |
| Comparative Example 4 | 0.10 | 72 | 75 | 74 |

From Table 1, it can be seen that the highland barley tea prepared with the preparation method of highland barley tea provided in the present disclosure has excellent transparency, maintains the natural flavor of the highland barley, and has refreshing and smooth mouthfeel, and quite outstanding mouthfeel advantage, thus both the taste and the mouthfeel are obviously superior to those in the comparative examples.

In addition, it can be seen from Table 1 that the highland barley tea provided in the present disclosure not only has significantly better mouthfeel and taste than that in the comparative examples, but also has higher overall public preference than the highland barley tea in the comparative examples, indicating that the highland barley tea provided in the present disclosure, when put on the market, can be accepted and loved by consumers.

Although the present disclosure has been illustrated and described with specific examples, it should be aware that many other alterations and modifications may be made without departing from the spirit and scope of the present disclosure. Therefore, it means that the attached claims cover all of these changes and modifications within the scope of the present disclosure.

INDUSTRIAL APPLICABILITY

The preparation method of highland barley tea provided in the present disclosure is simple and quick, has high extraction efficiency, and extracts active ingredients and nutrients thoroughly. The highland barley tea obtained by this preparation method effectively retains the nutritional ingredients in the highland barley, has the transparency of no more than 0.05 according to $OD_{720}$ and a soluble solid content of no less than 0.4, and has the natural flavor of the highland barley as well as smooth and refreshing mouthfeel. The highland barley tea obtained is directly edible, and also may be adjusted into drinks with different tastes by adding other flavorings, or may be modulated and used as a mother liquor to be mixed with other drinks and prepared into drinks with different tastes, or it is used as one of raw materials for making other food, which is advantageous for expanding the application range of the highland barley, and broadening the application market of the highland barley tea products.

The invention claimed is:
1. A preparation method for highland barley tea, comprising following steps:
stir-frying highland barley, wherein a temperature of the stir-frying is 175-179.5° C., and a time of the stir-frying is no more than 1 min;

soaking stir-fried highland barley in water to obtain a mixture of the stir-fried highland barley and water, and then extracting the stir-fried highland barley from the mixture of the stir-fried highland barley and water at a temperature of 95±1° C. to form a highland barley tea, wherein the soaking is performed at a temperature of 85-90° C., of duration of 40-50 min, and the extraction is performed for times no greater than 15 times, and the extraction lasts for 55-60 s each time; and filtering the highland barley tea after the extraction to obtain a filtered highland barley tea.

2. The preparation method according to claim 1, wherein an electrical conductivity of the water is not greater than 10 μs/cm.

3. The preparation method according to claim 1, wherein a ratio of a weight of the water to a weight of the highland barley is 15-18:1.

4. The preparation method according to claim 1, wherein further extraction and filtering steps are is-performed on the stir-fried highland barley to form additional highland barley tea for 14-15 times, and filtering and the extraction lasts for 55-60 s each time and all the highland barley tea from each extraction and filtering step are combined.

5. The preparation method according to claim 1, wherein a product obtained from the extraction is filtered with a 100±10 mesh filter bag or a 15±5 μm filter bag.

6. The preparation method according to claim 1, wherein a product obtained from the extraction is filtered with a 100±10 mesh filter bag and a 15±5 μm filter bag in sequence.

7. The preparation method according to claim 1, wherein a product obtained from the extraction, after being filtered, is cooled under a condition with a temperature no more than 30° C.

8. The preparation method according to claim 7, wherein after the cooling, a cooled product is further filtered with a 5±2 μm filter bag and a 1±0.5 μm filter cartridge in sequence, so as to obtain the highland barley tea.

9. The preparation method according to claim 8, wherein the filter cartridge is made of stainless steel material.

10. The preparation method according to claim 1, further comprising steps of cleaning and drying the highland barley before stir-frying the highland barley, wherein the cleaning comprises washing the highland barley with water.

11. The preparation method according to claim 10, wherein the drying is performed by baking the highland barley until a water content becomes 18 wt %-22 wt %.

12. The preparation method according to claim 1, further comprising a step of sterilization between the stir-frying and the soaking in water.

13. The preparation method according to claim 12, wherein the sterilization is embodied by microwave sterilization.

14. The preparation method according to claim 1, wherein the time of the stir-frying is 30-60 s.

15. Highland barley tea, wherein the highland barley tea is prepared by the preparation method according to claim 1.

16. The highland barley tea according to claim 15, wherein the highland barley tea has a transparency no more than 0.05 according to $OD_{720}$, and a soluble solid content no less than 0.4.

17. Product containing the highland barley tea according to claim 15, wherein the product comprises drinks, pastries or dishes.

* * * * *